US012706112B2

(12) United States Patent
Kawai et al.

(10) Patent No.: US 12,706,112 B2
(45) Date of Patent: Aug. 11, 2026

(54) MAGNETIC DISK DEVICE AND METHOD

(71) Applicants: KABUSHIKI KAISHA TOSHIBA, Kawasaki (JP); TOSHIBA ELECTRONIC DEVICES & STORAGE CORPORATION, Kawasaki (JP)

(72) Inventors: Takahiro Kawai, Yokohama Kanagawa (JP); Tetsuo Kuribayashi, Yokohama Kanagawa (JP); Takuya Mori, Yokohama Kanagawa (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 0 days.

(21) Appl. No.: 19/323,778

(22) Filed: Sep. 9, 2025

(65) Prior Publication Data

US 2026/0088042 A1 Mar. 26, 2026

(30) Foreign Application Priority Data

Sep. 20, 2024 (JP) ................................ 2024-163969

(51) Int. Cl.
*G11B 5/09* (2006.01)

(52) U.S. Cl.
CPC ..................................... *G11B 5/09* (2013.01)

(58) Field of Classification Search
CPC ..... G11B 19/045; G11B 5/09; G11B 5/59655; G11B 27/36; G11B 20/12; G11B 20/1205; G11B 20/1209; G11B 20/18; G11B 5/012; G11B 2220/2516; G11B 2220/63
USPC ..................................................... 360/53, 48
See application file for complete search history.

(56) References Cited

U.S. PATENT DOCUMENTS

| | | | |
|---|---|---|---|
| 7,345,837 B1 | 3/2008 | Schreck et al. | |
| 8,976,478 B1 * | 3/2015 | Harllee, III | G11B 20/10009 360/53 |
| 9,361,944 B1 | 6/2016 | Aoki | |
| 11,360,671 B2 | 6/2022 | Qiang et al. | |

* cited by examiner

*Primary Examiner* — Nabil Z Hindi
(74) *Attorney, Agent, or Firm* — Maier & Maier, PLLC

(57) ABSTRACT

According to one embodiment, a controller is configured to: set an increment amount for each of counters respectively corresponding to storage areas arranged in a radial direction of a magnetic disk; increment a value of a counter by the set increment amount for a storage area in the vicinity according to a write operation of writing data to the magnetic disk; execute, for each storage area, an operation of calculating a remaining number of write times, which is a number of write operations for a vicinity of one storage area that are executable until a value of a counter corresponding to the one storage area reaches a first threshold value, based on an increment amount for the one storage area; and execute a rewrite operation on each storage area in an order according to the remaining number of write times in an idle state.

20 Claims, 5 Drawing Sheets

MAGNETIC DISK DEVICE
1
2
HOST
I/F BUS
30
25
RWC
HDC
23
24
HEAD IC
29
BUFFER MEMORY
26
PROCESSOR
22 (22w, 22r)
13
15
11
16
28
FROM
27
RAM
21
MOTOR DRIVER IC
17
TEMPERATURE SENSOR
12
CONTROL SIGNAL
DATA

FIG.4

| | TRACK #0 | TRACK #1 | TRACK #2 | TRACK #3 | TRACK #4 |
|---|---|---|---|---|---|
| ATI COUNTER (Cn) | 80 | 100 | 120 | 140 | 160 |
| AVERAGE INCREMENT AMOUNT (Inc) | 30 | 20 | 10 | 5 | 2 |
| IMMEDIATE REWRITE THRESHOLD VALUE (Thi) | 200 | 200 | 200 | 200 | 200 |
| COUNTER RATIO (Cn/Thi) [%] | 40 | 50 | 60 | 70 | 80 |
| REMAINING NUMBER OF WRITE TIMES ((Thi-Cn)/Inc) | 4 | 5 | 8 | 12 | 20 |
| REWRITE PRIORITY | NOT TARGET | 1 | 1 | 2 | 2 |

MAGNETIC DISK DEVICE AND METHOD

CROSS-REFERENCE TO RELATED APPLICATIONS

This application is based upon and claims the benefit of priority from Japanese Patent Application No. 2024-163969, filed on Sep. 20, 2024; the entire contents of which are incorporated herein by reference.

FIELD

Embodiments described herein relate generally to a magnetic disk device and a method.

BACKGROUND

Adjacent track interference (ATI) is known as one of influences on adjacent tracks when writing to a magnetic disk. The influence of the ATI on an adjacent track is accumulated according to the number of write times for one track, and the data of the adjacent track becomes eventually difficult to be read. Therefore, before it becomes difficult to read the data of the adjacent track, all the data for the adjacent track is rewritten.

BRIEF DESCRIPTION OF THE DRAWINGS

FIG. 4 is a diagram for explaining a method in which a controller determines the order of execution of the idle rewrite operation according to the embodiment;

DETAILED DESCRIPTION

In general, according to one embodiment, a magnetic disk device includes a magnetic disk, a magnetic head, a memory, and a controller. The magnetic disk includes a first plurality of storage areas arranged in a radial direction. The magnetic head writes or reads data to or from the magnetic disk. The memory stores a plurality of counters that is a group of counters respectively corresponding to the first plurality of storage areas. The controller is configured to: set an increment amount for each of the plurality of counters; increment a value of a first counter by an increment amount related to the first counter according to a write operation of writing data to the magnetic disk, the first counter being a counter of the plurality of counters corresponding to a first storage area, the first storage area being a storage area in a vicinity of a first position that is a position where data is written by the write operation; execute an operation of calculating a remaining number of write times, which is a number of write operations for a vicinity of one storage area that are executable until a value of a counter corresponding to one storage area reaches a first threshold value, based on an increment amount for the one storage area, for each of a second plurality of storage areas that is some or all of the first plurality of storage areas; execute a rewrite operation on each of the second plurality of storage areas in an order according to the remaining number of write times in an idle state, the rewrite operation being an operation of reading all data from one storage area and writing all the read data to the one storage area; and reset, among the second plurality of storage areas, a value of a counter corresponding to a storage area on which the rewrite operation has been executed.

Exemplary embodiments of a magnetic disk device and a method will be explained below in detail with reference to the accompanying drawings. The present invention is not limited to the following embodiments.

Embodiment

Figure 1:
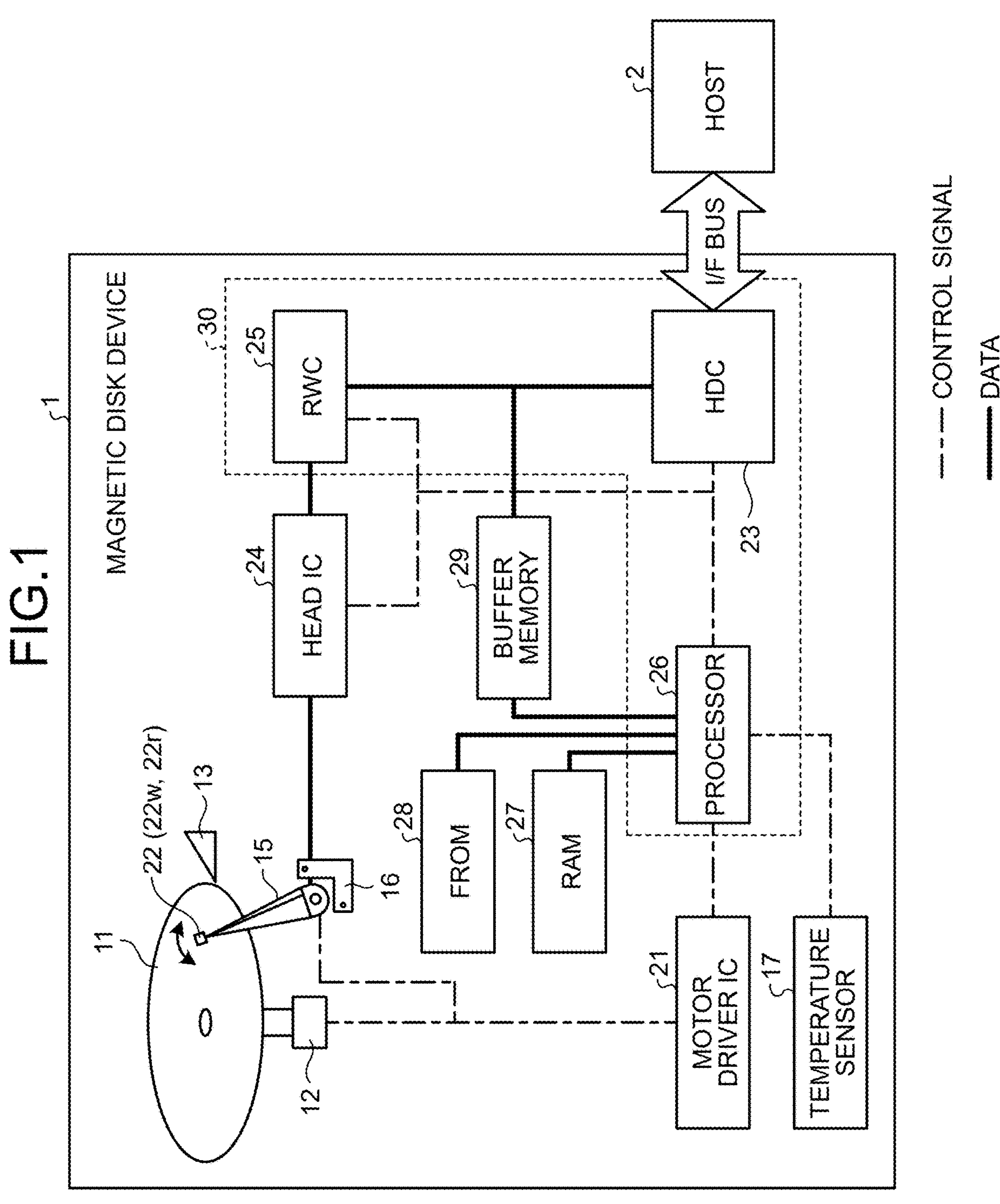
FIG. 1 is a schematic diagram illustrating an example of a configuration of a magnetic disk device according to an embodiment.

FIG. 1 is a schematic diagram illustrating an example of a configuration of a magnetic disk device 1 according to an embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 writes data to the magnetic disk 11 or reads data from the magnetic disk 11 in response to the access command.

Data is written and read via a magnetic head 22. In addition to the magnetic disk 11, the magnetic disk device 1 includes a spindle motor 12, a ramp 13, an actuator arm 15, a voice coil motor (VCM) 16, a temperature sensor 17, a motor driver integrated circuit (IC) 21, a magnetic head 22, a hard disk controller (HDC) 23, a head IC 24, a read/write channel (RWC) 25, a processor 26, a RAM 27, a flash read only memory (FROM) 28, and a buffer memory 29.

The magnetic disk 11 is rotated at a predetermined rotation speed by a spindle motor 12 attached coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 using a write head 22*w* and a read head 22*r* provided therein. In addition, the magnetic head 22 is attached to a distal end of the actuator arm 15. The magnetic head 22 is moved in the radial direction of the magnetic disk 11 by the VCM 16.

Note that one or both of the write head 22*w* and the read head 22*r* included in the magnetic head 22 may be provided in plural for a single magnetic head 22.

For example, when the rotation of the magnetic disk 11 is stopped or the like, the magnetic head 22 is moved onto the ramp 13. The ramp 13 holds the magnetic head 22 at a position separated from the magnetic disk 11.

The head IC 24 amplifies and outputs a signal read from the magnetic disk 11 by the magnetic head 22 during the read operation, and supplies the signal to the RWC 25. In addition, the head IC 24 amplifies a signal corresponding to the data to be written supplied from the RWC 25 and supplies the amplified signal to the magnetic head 22 during the write operation.

The HDC 23 controls transmission and reception of data with the host 2 via the I/F bus, controls the buffer memory 29, and the like.

The buffer memory 29 is used as a buffer for data transmitted to and received from the host 2. For example, the buffer memory 29 is used to temporarily store data to be written or data read from the magnetic disk 11.

The buffer memory 29 is configured by a volatile memory capable of high-speed operation. The type of the memory constituting the buffer memory 29 is not limited to a specific type. The buffer memory 29 can be configured by, for example, a dynamic random access memory (DRAM), a static random access memory (SRAM), or a combination thereof. Note that the buffer memory 29 may be configured by an arbitrary non-volatile memory.

The temperature sensor 17 detects a temperature at a position where the temperature sensor 17 is provided in the magnetic disk device 1. The temperature detected by the temperature sensor 17 is used by the processor 26 for various controls.

The RWC 25 performs modulation such as error correction coding on data to be written supplied from the HDC 23, and supplies the modulated data to the head IC 24. In addition, the RWC 25 performs demodulation including error correction processing on the signal read from the magnetic disk 11 and supplied from the head IC 24, and outputs the demodulated signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a non-volatile memory. The FROM 28 stores firmware (program data), various operation parameters, and the like. Note that the firmware may be stored in the magnetic disk 11.

The RAM 27 includes, for example, a DRAM, an SRAM, or a combination thereof. The RAM 27 is used as an operation memory by the processor 26. The RAM 27 is used as an area in which firmware is loaded and an area in which various types of management data are temporarily stored.

The processor 26 performs overall control of the magnetic disk device 1 according to firmware stored in the FROM 28 or the magnetic disk 11. For example, the processor 26 loads firmware from the FROM 28 or the magnetic disk 11 to the RAM 27, and executes control of the motor driver IC 21, the head IC 24, the RWC 25, the HDC 23, and the like according to the loaded firmware.

The configuration including the HDC 23, the RWC 25, and the processor 26 can also be regarded as the controller 30 that controls the operation of the magnetic disk device 1. In addition to these components, the controller 30 may include other elements (for example, the RAM 27, the FROM 28, the buffer memory 29, or the like).

Furthermore, the firmware program may be stored in the magnetic disk 11. In addition, some or all of the functions of the processor 26 may be implemented by a hardware circuit such as a field-programmable gate array (FPGA) or an application specific integrated circuit (ASIC).

Note that the number of the magnetic disks 11 included in the magnetic disk device 1 is not limited to one. Furthermore, the magnetic disk device 1 may include actuator arms 15 and magnetic heads 22 in a number corresponding to the number of magnetic disks 11. In addition, in a case where the magnetic disk device 1 includes a plurality of magnetic heads 22, the plurality of magnetic heads 22 may be integrally moved, or the plurality of magnetic heads 22 may constitute a plurality of groups that is independently movable.

Figure 2:
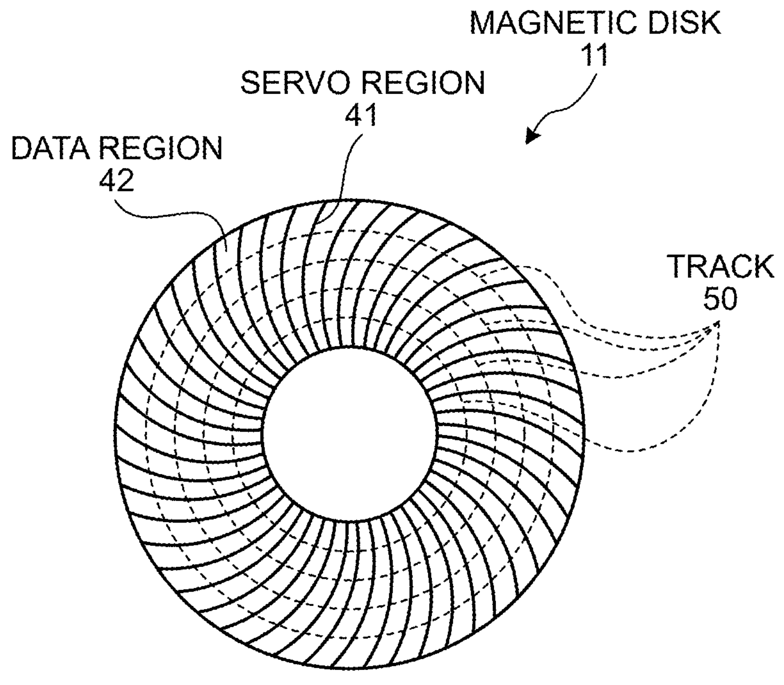
FIG. 2 is a diagram illustrating an example of a configuration of the magnetic disk according to the embodiment.

FIG. 2 is a diagram illustrating an example of a configuration of the magnetic disk 11 according to the embodiment. Servo information used for positioning the magnetic head 22 is written to the magnetic layer formed on the surface of the magnetic disk 11 by, for example, a servo writer or self-servo write (SSW).

FIG. 2 illustrates servo regions 41 radially arranged as an example of the arrangement of the servo regions in which the servo information is written. In the circumferential direction, a space between the two servo regions 41 is a data region 42 where data can be written. A plurality of concentric tracks 50 is provided in the radial direction of the magnetic disk 11. A plurality of sectors in which data of a predetermined size (sector size) is written is provided in the data region 42 on the track 50.

The servo information includes, for example, a servo mark, a gray code, a burst pattern, and a post code. When writing data to a data sector or reading data from a data sector, the controller 30 generates a positional error signal on the basis of servo information read from the servo region 41 by the magnetic head 22. The positional error signal indicates a deviation amount in the radial direction from the track center of the target track. The controller 30 executes positioning of the magnetic head 22, that is, seek control and tracking control on the basis of a positional error signal acquired each time the magnetic head 22 passes through the servo region 41. For example, before the start of the write operation, the controller 30 executes seek control to move the magnetic head 22 to the write target track 50. Then, tracking control of maintaining the magnetic head 22 on the write target track 50 is executed during a period from immediately before the start of the write operation to the end of the write operation.

As described above, when data is written to one track 50 (referred to as a write target track 50), the track 50 adjacent to the write target track 50 is affected by ATI. The influence of the ATI received by each of the tracks 50 is accumulated according to the number of write times with respect to the adjacent track 50. If the influence of the ATI received by the track 50 becomes too large, it becomes difficult to read the data stored in the track 50. That is, even if the error correction function is used, expected data cannot be acquired from the track 50.

The controller 30 executes the rewrite operation before each of the tracks 50 becomes difficult to read data due to the influence of ATI. The rewrite operation is an operation of reading all data from the track 50 and writing all the read data to the track 50 again. Such rewrite operation executed to prevent data reading from becoming difficult due to the influence of ATI is also referred to as a refresh operation or ATI refresh. Hereinafter, the rewrite operation refers to a rewrite operation executed to prevent data reading from becoming difficult due to the influence of ATI.

The controller 30 estimates the degree of influence of the ATI accumulated in each of the tracks 50 using the ATI counter. The value of the ATI counter is regarded as numerical information indicating the degree of influence of the ATI accumulated in the corresponding track 50. The controller 30 executes the rewrite operation on the corresponding track 50 before the value of the ATI counter exceeds the threshold value corresponding to the upper limit value of the range in which the expected data can be acquired.

Note that, in this example, the ATI counter is provided for each of the tracks 50. Alternatively, in order to suppress the total number of ATI counters, the ATI counter may be provided for each storage area including two or more tracks 50 arranged continuously in the radial direction. In the following example, it is assumed that the ATI counter is provided for each of the tracks 50.

Various management information including the ATI counter is stored in a predetermined memory in the magnetic disk device 1.

Figure 3:
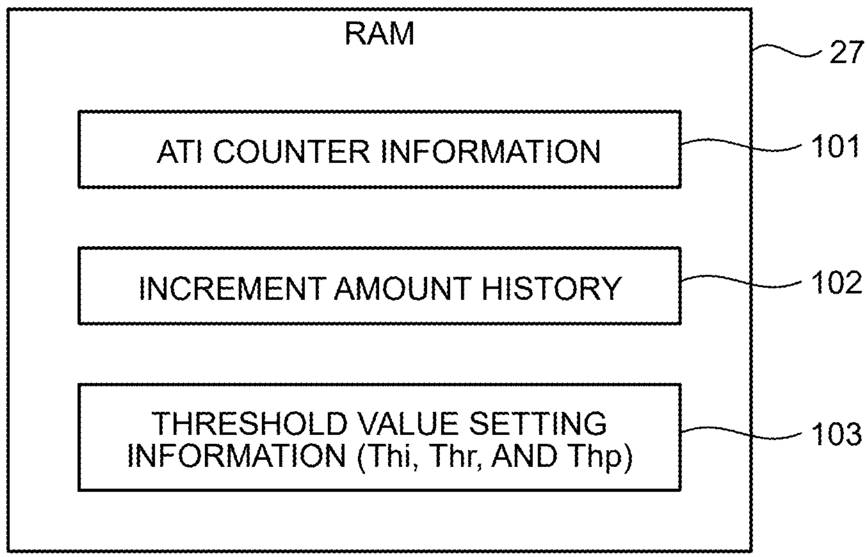
FIG. 3 is a diagram illustrating an example of management information used by the magnetic disk device according to the embodiment.

FIG. 3 is a diagram illustrating an example of management information used by the magnetic disk device 1 according to the embodiment. Note that, in this example, all the management information is stored in the RAM 27, but the location where the management information is stored is not limited to the RAM 27. In addition, the management information may be distributed to a plurality of memories.

The RAM 27 stores ATI counter information 101, an increment amount history 102, and threshold value setting information 103.

The ATI counter information 101 is a group of ATI counters corresponding to each of the tracks 50.

The value of the ATI counter of the adjacent track 50 is incremented according to the execution of the write operation on the write target track 50. The increment amount of the ATI counter may vary depending on the situations. Therefore, the controller 30 changes the increment amount of the ATI counter according to the situation.

For example, as the vibration of the magnetic head 22 during the write operation to the write target track 50 is larger, the influence of the ATI received by the adjacent track 50 is larger. In addition, as the temperature during the write operation to the write target track 50 is higher, the influence of the ATI received by the adjacent track 50 is larger. The controller 30 increases the increment amount of the ATI counter of the adjacent track 50 as the vibration of the magnetic head 22 during the write operation to the write target track 50 increases. In addition, the controller 30 increases the increment amount of the ATI counter of the adjacent track 50 as the temperature during the write operation to the write target track 50 is higher.

In one example, the controller 30 acquires the magnitude of the vibration of the magnetic head 22 on the basis of the positional error signal during the write operation. The controller 30 determines that the larger the absolute value of the positional error signal, the larger the vibration of the magnetic head 22. For example, the controller 30 calculates an average of absolute values of the positional error signal in a period in which writing is performed on the write target track 50. Then, the controller 30 may use the average value of the absolute values of the positional error signal as the magnitude of the vibration of the magnetic head 22. Note that the method of determining the magnitude of the vibration of the magnetic head 22 is not limited thereto.

In this way, the increment amount varies for each of the tracks 50 and for each situation. The controller 30 records the history of the applied increment amount in the increment amount history 102 for each of the tracks 50.

The update timing of the increment amount for each of the tracks 50 is not limited to a specific timing. The controller 30 may store the vibration of the magnetic head 22 at the time of the write operation and the temperature at the time of the write operation, and set the increment amount of some or all of the tracks 50 at some timing on the basis of the stored vibration or temperature of the magnetic head 22. Alternatively, the controller 30 may set the increment amount for the ATI counter of the adjacent track 50 of the write target track 50 every time the write operation is executed. Here, as an example, the controller 30 sets the increment amount for the ATI counter of the adjacent track 50 of the write target track 50 for each write operation.

The threshold value setting information 103 includes an immediate rewrite threshold value Thi, a ratio threshold value Thr, and a priority determination threshold value Thp. These threshold values are determined in the manufacturing process and recorded in the threshold value setting information 103. The threshold value setting information 103 is stored in a predetermined non-volatile storage area (for example, the FROM 28) and loaded into the RAM 27 when the magnetic disk device 1 is operating. Then, the threshold value setting information 103 loaded into the RAM 27 is appropriately referred to. Note that the threshold value setting information 103 stored in a predetermined non-volatile storage area may be directly referred to.

The immediate rewrite threshold value Thi is a threshold value to be compared with the value of the ATI counter, and is a threshold value corresponding to an upper limit value of a range in which expected data can be acquired. That is, if the value of the ATI counter does not exceed the immediate rewrite threshold value Thi, it is ensured that expected data can be acquired from the corresponding track 50. The immediate rewrite threshold value Thi may be equal to an upper limit value of a range in which expected data can be acquired, or a value obtained by subtracting a predetermined value from the upper limit value may be set as the immediate rewrite threshold value Thi.

The ratio threshold value Thr and the priority determination threshold value Thp will be described later.

In the embodiment, the controller 30 can execute two types of rewrite operations. The two types of rewrite operations are an immediate rewrite operation and an idle rewrite operation. The immediate rewrite threshold value Thi is used for determining execution of an immediate rewrite operation. That is, the immediate rewrite operation is a rewrite operation executed in response to the value of the ATI counter reaching the immediate rewrite threshold value Thi. The idle rewrite operation is a rewrite operation executed by the controller 30 in a state where execution of all commands from the host 2 is completed, that is, in an idle state. The idle rewrite operation may be executed before the value of the ATI counter reaches the immediate rewrite threshold value Thi.

The immediate rewrite operation is executed in response to the value of the ATI counter reaching the immediate rewrite threshold value Thi regardless of whether or not a command from the host 2 remains. Therefore, if the immediate rewrite operation is frequently executed, the speed of the command response to the host 2 may be reduced. That is, the performance of the magnetic disk device 1 viewed from the host 2 may be deteriorated. Therefore, it is required to suppress the frequency of the immediate rewrite operation.

A technique to be compared with the embodiment will be described. A technique to be compared with the embodiment is referred to as a comparative example. According to the comparative example, the evaluation value is acquired for each of the tracks by calculation of dividing the value of the ATI counter by the immediate rewrite threshold value Thi. Then, the idle rewrite operation is executed with a track having a larger evaluation value being prioritized over a track having a smaller evaluation value.

However, as described above, the increment amount of the value of the ATI counter may vary depending on the situations. Therefore, even if the evaluation values are the same, in a case where the increment amount is large, the value of the ATI counter reaches the immediate rewrite threshold value Thi by a smaller number of write operations than in a case where the increment amount is small. That is, the evaluation value according to the comparative example does not correspond to the number of write operations for the adjacent track that can be executed until the value of the ATI counter reaches the immediate rewrite threshold value Thi, in other words, the margin of the number of write operations for the adjacent track. Therefore, there may be a case where execution of the immediate rewrite operation cannot be prevented.

In the embodiment, the controller 30 executes the idle rewrite operation on the plurality of tracks 50 in the order based on the margin of the number of write operations for the adjacent track 50. Since the track 50 having a smaller margin of the number of write operations for the adjacent track 50 is preferentially selected as a target of the rewrite operation, the frequency of the immediate rewrite operation is efficiently reduced as compared with the comparative example. That is, it is possible to efficiently execute the rewrite operation in that the execution frequency of the immediate rewrite operation can be suppressed.

FIG. 4 is a diagram for explaining a method in which the controller 30 determines the order of execution of the idle rewrite operation according to the embodiment. Here, in order to facilitate understanding, five tracks #0 to #4 are provided in the magnetic disk 11, and the order of the idle rewrite operation is determined from among the five tracks #0 to #4.

In FIG. 4, the value of the ATI counter, the average increment amount, the immediate rewrite threshold value Thi, the counter ratio, the remaining number of write times, and the rewrite priority are displayed for each of the five tracks 50 (tracks #0 to #4).

The values of the ATI counters of the tracks #0 to #4 are recorded in the ATI counter information 101. In this example, the value of the ATI counter of the track #0 is "80", the value of the ATI counter of the track #1 is "100", the value of the ATI counter of the track #2 is "120", the value of the ATI counter of the track #3 is "140", and the value of the ATI counter of the track #4 is "160". Hereinafter, the value of the ATI counter may be referred to as Cn.

The average increment amount is an average of the increment amounts applied within a predetermined time nearby. The history of the applied increment amount is recorded in the increment amount history 102 for each of the tracks 50. The controller 30 calculates the average increment amount on the basis of the history of the applied increment amount recorded in the increment amount history 102. In this example, the average increment amount of the track #0 is "30", the average increment amount of the track #1 is "20", the average increment amount of the track #2 is "10", the average increment amount of the track #3 is "5", and the average increment amount of the track #4 is "2". Hereinafter, the average increment amount may be referred to as Inc.

As the immediate rewrite threshold value Thi, "200" is commonly set for all the tracks 50. Note that the set value of the immediate rewrite threshold value Thi is not necessarily common to all the tracks 50. For example, in a case where a plurality of magnetic heads 22 is provided in the magnetic disk device 1, a different value may be set as the immediate rewrite threshold value Thi for each storage area accessed by each of the plurality of magnetic heads 22.

The counter ratio is a ratio of the value Cn of the ATI counter to the immediate rewrite threshold value Thi. That is, the counter ratio is obtained by dividing the value Cn of the ATI counter by the immediate rewrite threshold value Thi. Here, as an example, the counter ratio is referred to as a percentage.

The remaining number of write times is the number of write operations for the adjacent track that can be executed until the value of the ATI counter reaches the immediate rewrite threshold value Thi. The controller 30 subtracts the value Cn of the ATI counter from the immediate rewrite threshold value Thi and divides a value obtained by the subtraction, that is, (Thi−Cn) by the average increment amount Inc to acquire the remaining number of write times. In this example, the remaining number of write times of the track #0 is "4", the remaining number of write times of the track #1 is "5", the remaining number of write times of the track #2 is "8", the remaining number of write times of the track #3 is "12", and the remaining number of write times of the track #4 is "20".

The controller 30 determines the priority of execution of the idle rewrite operation on the basis of the remaining number of times. The priority of execution of the idle rewrite operation is referred to as a rewrite priority. Here, a small value of the rewrite priority means that the priority of execution of the idle rewrite operation is high.

Note that, here, the track 50 of which the counter ratio has not reached the predetermined value is excluded from the target of the setting of the rewrite priority. For example, in the track 50 of which the average increment amount is significantly larger than that of the other tracks 50 such as the track #0, the remaining number of write times may be significantly smaller than that of the other tracks 50. In such a case, since the rewrite priority of the track 50 having a significantly larger average increment amount than the other tracks 50 is high, the frequency of the idle rewrite operation executed for the track 50 becomes high. When the idle rewrite operation is executed for a specific track 50 at a high frequency, the accumulation speed of the influence of the ATI received by the adjacent track 50 of the specific track 50 is high, and the frequency of the rewrite operation executed for the adjacent track 50 is also high.

Therefore, in the embodiment, even in the case of the track 50 of which the remaining number of write times is small, if the accumulated degree of influence of the ATI, that is, the counter ratio is less than the predetermined level, the controller 30 does not select the track 50 as the target of the idle rewrite operation. This prevents the frequency of executing the idle rewrite operation from increasing in the specific track 50 having a significantly large average increment amount and the track 50 around the specific track 50.

The threshold value to be compared with the counter ratio is recorded in the threshold value setting information 103 as the ratio threshold value Thr. The controller 30 excludes the track 50 of which the counter ratio is smaller than the ratio threshold value Thr from the target of the idle rewrite operation, and executes the idle rewrite operation on one or more tracks 50 whose counter ratio is larger than the ratio threshold value Thr in the order according to the remaining number of write times. Note that the track 50 of which the counter ratio is equal to the ratio threshold value Thr may be excluded from the target of the idle rewrite operation or may be the target of the idle rewrite operation. Here, as an example, it is assumed that the track 50 of which the counter ratio is equal to the ratio threshold value Thr is also a target of the idle rewrite operation.

In the example illustrated in FIG. 4, the ratio threshold value Thr is "50". That is, the track 50 of which the counter ratio is less than 50% is excluded from the target of the idle rewrite operation. The counter ratio of the track #0 is less than 50%, and the counter ratios of the tracks #1 to #4 are 50% or more. Therefore, the controller 30 excludes the track #0 from the target of the idle rewrite operation, and executes the idle rewrite operation on the tracks #1 to #4.

The controller 30 can execute the idle rewrite operation on one or more tracks 50 targeted for the idle rewrite operation in an order according to the remaining number of write times. In the embodiment, in order to reduce the calculation cost, the execution order of the idle rewrite operation is determined as follows. That is, a threshold value to be compared with the remaining number of write times is set in advance as the priority determination threshold value Thp. The controller 30 executes the idle rewrite operation for all the tracks 50 in which the remaining number of write times is smaller than the priority determination threshold value Thp prior to the idle rewrite operation for any track 50 of which the remaining number of write times is larger than the priority determination threshold value Thp. That is, the rewrite priority of all the tracks 50 of which the remaining number of write times is smaller than the priority determination threshold value Thp is “1” indicating that the priority is the highest. The rewrite priority of all the tracks 50 of which the remaining number of write times is larger than the priority determination threshold value Thp is set to “2” indicating that the priority is the second. The rewrite priority of the track 50 of which the remaining number of write times is equal to the priority determination threshold value Thp may be “1” or “2”.

Note that the order of execution of the idle rewrite operation is not limited thereto. The controller 30 may execute the idle rewrite operation in the order of the remaining number of write times from the track 50 having a small remaining number of write times.

Next, the operation of the magnetic disk device 1 of the embodiment will be described.

Figure 5:
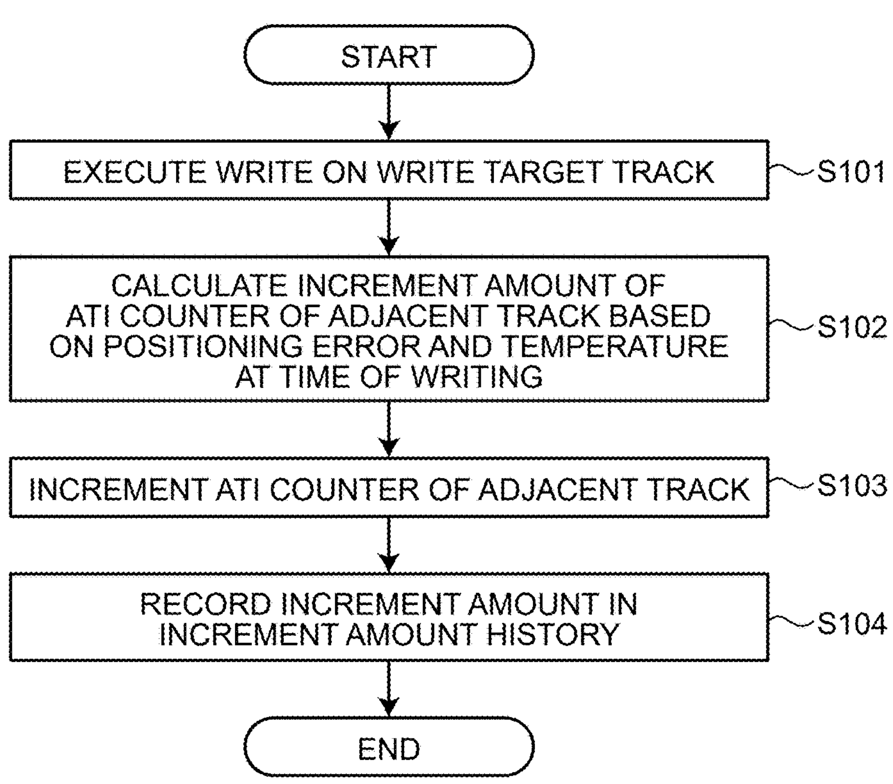
FIG. 5 is a flowchart illustrating an example of a series of operations according to the write operation of the embodiment.

FIG. 5 is a flowchart illustrating an example of a series of operations according to the write operation of the embodiment.

When the controller 30 executes writing to a certain write target track 50 (S101), the increment amount of the ATI counter of the adjacent track 50 of the write target track 50 is calculated based on the positional error signal and the temperature at the time of writing (S102). Note that the controller 30 acquires the temperature at the time of writing from the temperature sensor 17.

Subsequently, the controller 30 increments the ATI counter of the adjacent track 50 by the increment amount acquired by the calculation in S102 (S103).

The controller 30 records the increment amount of the adjacent track 50 in the increment amount history 102 (S104), and ends the write operation.

Note that, in the example illustrated in FIG. 5, random write, that is, an operation of writing data to a part of the track 50 is assumed. In a case where data corresponding to one track is written to the write target track 50, the controller 30 may reset the ATI counter of the write target track 50 to “0” after the writing.

Figure 6:
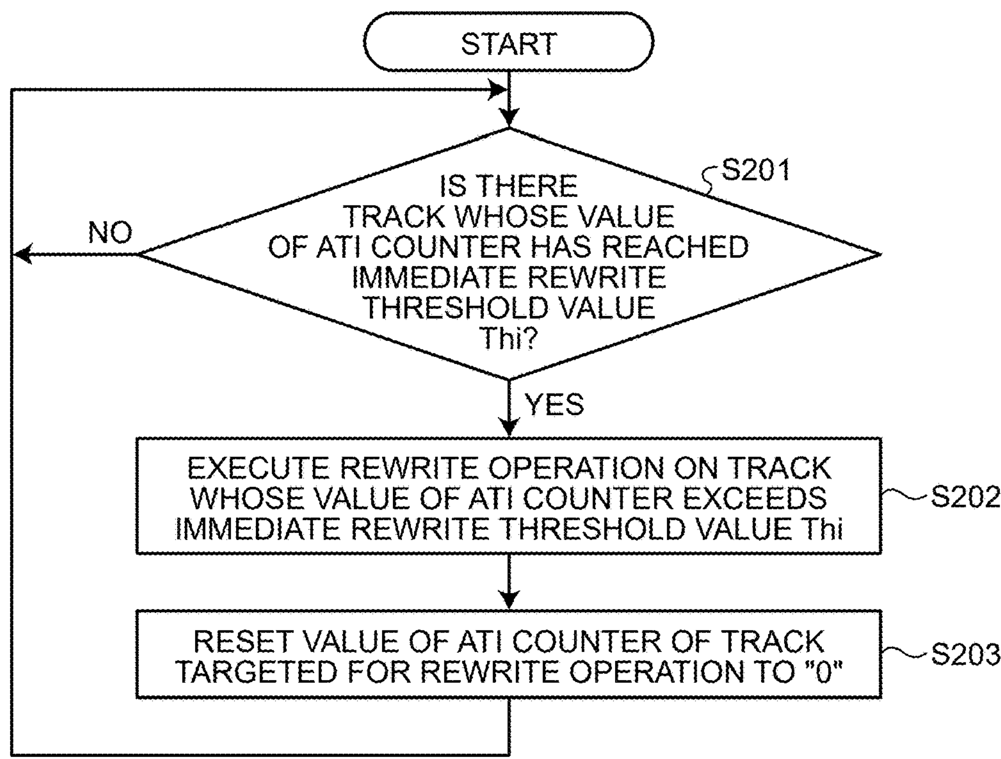
FIG. 6 is a flowchart illustrating an example of a series of operations according to the immediate rewrite operation of the embodiment.

FIG. 6 is a flowchart illustrating an example of a series of operations according to the immediate rewrite operation of the embodiment.

The controller 30 determines whether or not there is a track 50 of which the value of the ATI counter has reached the immediate rewrite threshold value Thi (S201).

In a case where there is the track 50 of which the value of the ATI counter has reached the immediate rewrite threshold value Thi (S201: Yes), the controller 30 executes the rewrite operation on the track 50 of which the value of the ATI counter has reached the immediate rewrite threshold value Thi (S202).

Note that the rewrite operation includes a read operation and a write operation. Therefore, in the write operation included in the rewrite operation, the operation of the example illustrated in FIG. 5 is performed.

After the rewrite operation, the controller 30 resets the value of the ATI counter of the track 50 targeted for the rewrite operation to “0”(S203).

After the processing of S203, or in a case where there is no track 50 of which the value of the ATI counter has reached the immediate rewrite threshold value Thi (S201: No), the control transitions to S201.

In this manner, the controller 30 monitors whether or not there is the track 50 of which the value of the ATI counter has reached the immediate rewrite threshold value Thi. Then, in a case where there is a track 50 of which the value of the ATI counter has reached the immediate rewrite threshold value Thi, the controller 30 executes the rewrite operation on the track 50 and resets the value of the ATI counter of the track 50 to “0”.

Note that, as described above, the immediate rewrite operation is executed even when an uncompleted command remains.

Figure 7:
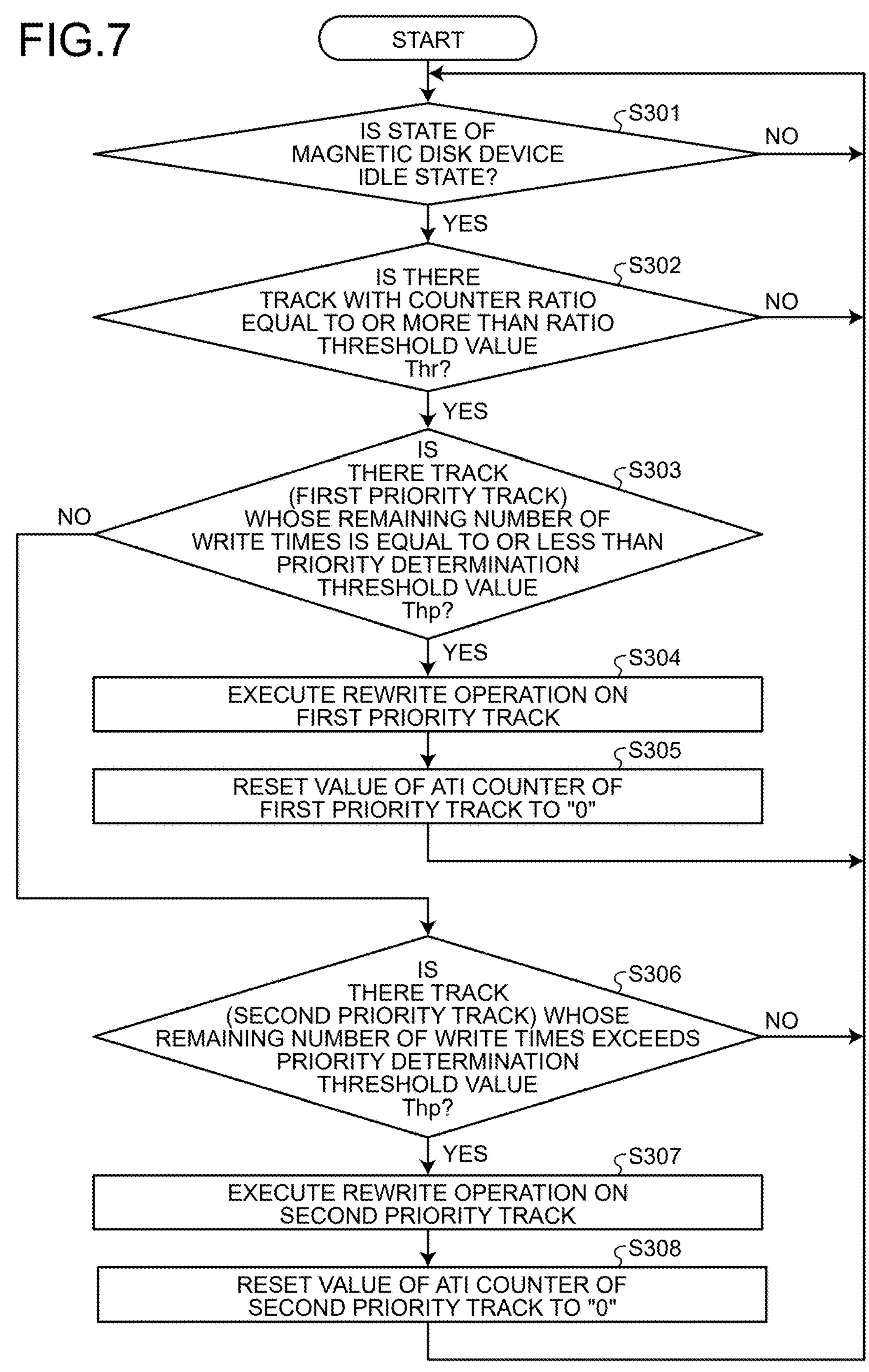
FIG. 7 is a flowchart illustrating an example of a series of operations according to the idle rewrite operation of the embodiment.

FIG. 7 is a flowchart illustrating an example of a series of operations according to the idle rewrite operation of the embodiment.

The controller 30 determines whether or not the state of the magnetic disk device 1 is an idle state (S301). In a case where the state of the magnetic disk device 1 is not the idle state (S301: No), the control transitions to S301.

In a case where the state of the magnetic disk device 1 is the idle state (S301: Yes), the controller 30 determines whether or not there is a track 50 of which the counter ratio is equal to or larger than the ratio threshold value Thr, that is, a track 50 to be subjected to the idle rewrite operation (S302). In S302, for example, the controller 30 acquires the counter ratio for each of the tracks 50. Then, the controller 30 compares the counter ratio of each of the tracks 50 with the ratio threshold value Thr.

In a case where there is the track 50 of which the counter ratio is equal to or more than the ratio threshold value Thr (S302: Yes), it is determined whether or not there is the track 50 of which the remaining number of write times is equal to or less than the priority determination threshold value Thp, that is, the track 50 of which the rewrite priority is “1” among the tracks 50 of which the counter ratio is equal to or more than the ratio threshold value Thr (S303). In S303, for example, the controller 30 acquires the remaining number of write times for each of the tracks 50 of which the counter ratio is equal to or greater than the ratio threshold value Thr.

Then, the controller 30 compares the remaining number of write times with the ratio threshold value Thr for each of the tracks 50 of which the counter ratio is the ratio threshold value Thr or more. Among the tracks 50 of which the counter ratio is equal to or more than the ratio threshold value Thr, the track 50 of which the remaining number of write times is equal to or less than the priority determination threshold value Thp, that is, the track 50 of which the rewrite priority is “1” is referred to as a first priority track 50.

In a case where there is the first priority track 50 (S303: Yes), the controller 30 executes the rewrite operation on the first priority track 50 (S304), and resets the value of the ATI counter of the first priority track 50 to “0” (S305). In a case where there is a plurality of first priority tracks 50, the controller 30 executes S304 and S305 on one of the plurality of first priority tracks 50. Note that the controller 30 may execute S304 and S305 on two or more first priority tracks 50.

In a case where there is no track 50 of which the remaining number of write times is equal to or less than the priority determination threshold value Thp among the tracks 50 of which the counter ratio is equal to or more than the ratio threshold value Thr (S303: No), the controller 30 determines whether or not there is a track 50 of which the remaining number of write times is equal to or less than the priority determination threshold value Thp among the tracks 50 of which the counter ratio is equal to or more than the ratio threshold value Thr, that is, a track 50 of which the rewrite priority is "2" (S306). In S306, for example, the controller 30 compares the remaining number of write times with the ratio threshold value Thr for each of the tracks 50 of which the counter ratio is equal to or more than the ratio threshold value Thr. Among the tracks 50 of which the counter ratio is equal to or greater than the ratio threshold value Thr, the track 50 of which the remaining number of write times exceeds the priority determination threshold value Thp, that is, the track 50 of which the rewrite priority is "2" is referred to as a second priority track 50.

In a case where there is the second priority track 50 (S306: Yes), the controller 30 executes the rewrite operation on the second priority track 50 (S307), and resets the value of the ATI counter of the second priority track 50 to "0" (S308). In a case where there is a plurality of second priority tracks 50, the controller 30 executes S307 and S308 on one of the plurality of second priority tracks 50. Note that the controller 30 may execute S307 and S308 on two or more second priority tracks 50.

In a case where there is no track 50 of which the counter ratio is equal to or larger than the ratio threshold value Thr (S302: No), after the processing of S305, or in a case where there is no second priority track 50 (S306: No), or after the processing of S308, the control transitions to S301.

As described above, when there are the first priority track 50 and the second priority track 50, the controller 30 executes the rewrite operation on the first priority track 50 before the rewrite operation on the second priority track 50. When there is no first priority track 50, the controller 30 executes the rewrite operation on the second priority track 50. That is, the controller 30 can preferentially execute the rewrite operation on the track 50 having a small remaining number of write times as compared with the rewrite operation on the track 50 having a large remaining number of write times.

Note that, according to the example described above, the value of the ATI counter of the adjacent track 50 is incremented as the write operation for one track 50 is executed. The track 50 on which the ATI counter is incremented is not limited only to the adjacent track 50 of the track 50 on which the write operation has been executed. The ATI counters of not only the adjacent track 50 but also all the tracks 50 in the vicinity of the track 50 on which the write operation has been executed may be incremented. The track 50 in the vicinity of the track 50 on which the write operation is executed is the track 50 included in the radial range that can be affected by the ATI by the write operation, and may include the track 50 at a position separated from the track 50 on which the write operation is executed by two tracks 50 or more. The radial range over which the ATI counter is incremented can be set by a designer.

Furthermore, according to the example described above, the ATI counter is provided for each of the tracks 50. The unit in which the ATI counter is provided is not limited to the unit of the track 50. The plurality of tracks 50 provided in the magnetic disk 11 may be divided into a plurality of storage areas each including one or more tracks 50 arranged in the radial direction, and a corresponding ATI counter may be provided for each of the plurality of storage areas. In such a case, the controller 30 sets the increment amount of the ATI counter for each storage area. Then, during the write operation, the ATI counter in the storage area in the vicinity of the position (for example, the track 50) where the write operation has been executed is incremented by a preset increment amount.

In addition, according to the example described above, the controller 30 excludes the track 50 of which the counter ratio is smaller than the ratio threshold value Thr from the target of the idle rewrite operation. The controller 30 may set all the tracks 50 as the target of the idle rewrite operation regardless of the counter ratio.

In addition, according to the example described above, the controller 30 calculates the counter ratio and the remaining number of write times when the state of the magnetic disk device 1 is the idle state. The timing of the counter ratio and the timing of calculating the remaining number of write times are not limited thereto. For example, when the value of any ATI counter is updated, the controller 30 may calculate the timing of the counter ratio of the track 50 corresponding to the ATI counter whose value has been updated, the remaining number of write times, or both.

As described above, according to the embodiment, the group of ATI counters corresponding to each of the plurality of storage areas (for example, the track 50) arranged in the radial direction is stored in the memory (for example, the RAM 27). The controller 30 sets an increment amount for each of the plurality of storage areas (see, for example, S102 in FIGS. 4 and 5). The controller 30 increments the value of the ATI counter of the storage area in the vicinity of the position where the write operation is executed according to the write operation by a set increment amount. The controller 30 executes, for each of the one or more storage areas, an operation of calculating the remaining number of times, which is the number of write operations for the vicinity that can be executed until the value of the ATI counter corresponding to the one storage area reaches the immediate rewrite threshold value Thi, based on the increment amount for the one storage area (see, for example, S303 and S306 in FIGS. 4 and 7). In the idle state, the controller 30 executes the rewrite operation on each of one or more storage areas in an order according to the remaining number of write times (for example, see FIG. 7). Then, the controller 30 resets the value of the ATI counter corresponding to the storage area on which the rewrite operation has been executed (see, for example, S305 and S308 in FIG. 7).

Therefore, the execution frequency of the immediate rewrite operation can be suitably suppressed, and the execution efficiency of the rewrite operation is improved.

Note that, according to the embodiment, the controller 30 executes the immediate rewrite operation as follows. That is, the controller 30 specifies a storage area in which the value of the corresponding ATI counter has reached the immediate rewrite threshold value Thi among the plurality of storage areas (for example, see S201 in FIG. 6). The controller 30 executes the rewrite operation on the storage area in which the value of the specified ATI counter has reached the immediate rewrite threshold value Thi (see, for example, S202 in FIG. 6). Then, the controller 30 resets the value of the ATI counter corresponding to the storage area on which the rewrite operation has been executed (see, for example, S203 in FIG. 6).

Since the controller 30 executes the idle rewrite operation for each storage area in the order according to the remaining number of write times, the execution frequency of the immediate rewrite operation can be suitably suppressed.

In addition, according to the embodiment, in the idle state, the controller 30 executes the rewrite operation for a storage area having a large remaining number of times after executing the rewrite operation for a storage area having a small remaining number of times.

Therefore, since the idle rewrite operation for the track 50 having a small remaining number of write times is preferentially executed, the execution frequency of the immediate rewrite operation can be suitably suppressed.

In addition, according to the embodiment, the controller 30 compares the remaining number of times of each storage area with the priority determination threshold value Thp in the idle state. The controller 30 executes the rewrite operation on the storage area in which the remaining number of times is larger than the priority determination threshold value Thp after the rewrite operation on the storage area in which the remaining number of times is smaller than the priority determination threshold value Thp (for example, see FIG. 7).

Therefore, since the idle rewrite operation on the track 50 of which the remaining number of write times is smaller than the priority determination threshold value Thp is preferentially executed, the execution frequency of the immediate rewrite operation can be suitably suppressed.

Note that the priority determination threshold value Thp may include a plurality of threshold values having different values. For example, consider a case where the priority determination threshold values Thp1 and Thp2 (where Thp1<Thp2) are provided as the priority determination threshold value Thp. In such a case, the controller 30 first executes the rewrite operation on all the tracks 50 in which the remaining number of write times among the tracks 50 targeted for the idle rewrite operation is smaller than the priority determination threshold value Thp1. Next, the controller 30 executes the rewrite operation on all the tracks 50 in which the remaining number of write times among the tracks 50 targeted for the idle rewrite operation is larger than the priority determination threshold value Thp1 and smaller than the priority determination threshold value Thp2. Next, the controller 30 executes the rewrite operation on all the tracks 50 in which the remaining number of write times is larger than the priority determination threshold value Thp2 among the tracks 50 targeted for the idle rewrite operation. As described above, the controller 30 may preferentially execute the idle rewrite operation on the track 50 having a small remaining number of write times on the basis of a plurality of priority determination threshold values having different values.

Note that, according to the embodiment, the controller 30 can set the increment amount according to the temperature during the write operation or the vibration of the magnetic head 22 (see, for example, S102 in FIG. 5). Note that the method of setting the increment amount is not limited thereto. The controller 30 may set the increment amount according to an arbitrary amount in addition to the temperature and the vibration of the magnetic head 22 during the write operation, or instead of the temperature and the vibration of the magnetic head 22 during the write operation.

In addition, according to the embodiment, the controller 30 calculates a counter ratio of each storage area. Then, the controller 30 specifies a storage area in which the counter ratio is larger than the ratio threshold value Thr as a target of the idle rewrite operation, and specifies a storage area in which the counter ratio is smaller than the ratio threshold value Thr as a non-target of the idle rewrite operation (see, for example, S302 in FIG. 7).

Therefore, it is possible to prevent the execution frequency of the idle rewrite operation for the track 50 having a significantly large increment amount from being significantly increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk including a first plurality of storage areas arranged in a radial direction;

a magnetic head configured to write or read data to or from the magnetic disk;

a memory configured to store a plurality of counters that is a group of counters respectively corresponding to the first plurality of storage areas; and a controller configured to:

set an increment amount for each of the plurality of counters;

increment a value of a first counter by an increment amount related to the first counter according to a write operation of writing data to the magnetic disk, the first counter being a counter of the plurality of counters corresponding to a first storage area, the first storage area being a storage area in a vicinity of a first position that is a position where data is written by the write operation;

execute an operation of calculating a remaining number of write times, which is a number of write operations for a vicinity of one storage area that are executable until a value of a counter corresponding to the one storage area reaches a first threshold value, based on an increment amount for the one storage area, for each of a second plurality of storage areas that is some or all of the first plurality of storage areas;

execute a rewrite operation on each of the second plurality of storage areas in an order according to the remaining number of write times in an idle state, the rewrite operation being an operation of reading all data from one storage area and writing all the read data to the one storage area; and reset, among the second plurality of storage areas, a value of a counter corresponding to a storage area on which the rewrite operation has been executed.

2. The magnetic disk device according to claim 1, wherein the controller is configured to:

specify, among the first plurality of storage areas, a storage area in which a value of a corresponding counter has reached the first threshold value;

execute the rewrite operation on the specified storage area; and reset a value of a counter corresponding to the specified storage area.

3. The magnetic disk device according to claim 1, wherein the controller is configured to execute the rewrite operation on a second storage area in the idle state, and execute the rewrite operation on a third storage area after the rewrite operation on the second storage area, the remaining number of write times for the second storage area being smaller than the remaining number of write times for the third storage area.

4. The magnetic disk device according to claim 1, wherein the controller is configured to compare the remaining number of write times with a second threshold value for each of the second plurality of storage areas in the idle state, and execute, among the second plurality of storage areas, the rewrite operation on a storage area in which the remaining number of write times is larger than the second threshold value after the rewrite operation on a storage area in which the remaining number of write times is smaller than the second threshold value.

5. The magnetic disk device according to claim 1, wherein the controller is configured to set the increment amount for the counter corresponding to the first storage area according to a vibration of the magnetic head or a temperature during the write operation with respect to the first position.

6. The magnetic disk device according to claim 1, wherein the controller is further configured to:

calculate, for each of the first plurality of storage areas, a counter ratio that is a value obtained by dividing a value of a corresponding counter by the first threshold value;

specify, among the first plurality of storage areas, a storage area in which the counter ratio is larger than a third threshold value as one of the second plurality of storage areas; and specify, among the first plurality of storage areas, a storage area in which the counter ratio is smaller than the third threshold value as one storage area that is not one of the second plurality of storage areas.

7. The magnetic disk device according to claim 2, wherein the controller is further configured to:

calculate, for each of the first plurality of storage areas, a counter ratio that is a value obtained by dividing a value of a corresponding counter by the first threshold value;

specify, among the first plurality of storage areas, a storage area in which the counter ratio is larger than a third threshold value as one of the second plurality of storage areas; and specify, among the first plurality of storage areas, a storage area in which the counter ratio is smaller than the third threshold value as one storage area that is not one of the second plurality of storage areas.

8. The magnetic disk device according to claim 3, wherein the controller is further configured to:

calculate, for each of the first plurality of storage areas, a counter ratio that is a value obtained by dividing a value of a corresponding counter by the first threshold value;

specify, among the first plurality of storage areas, a storage area in which the counter ratio is larger than a third threshold value as one of the second plurality of storage areas; and specify, among the first plurality of storage areas, a storage area in which the counter ratio is smaller than the third threshold value as one storage area that is not one of the second plurality of storage areas.

9. The magnetic disk device according to claim 4, wherein the controller is further configured to:

calculate, for each of the first plurality of storage areas, a counter ratio that is a value obtained by dividing a value of a corresponding counter by the first threshold value;

specify, among the first plurality of storage areas, a storage area in which the counter ratio is larger than a third threshold value as one of the second plurality of storage areas; and specify, among the first plurality of storage areas, a storage area in which the counter ratio is smaller than the third threshold value as one storage area that is not one of the second plurality of storage areas.

10. The magnetic disk device according to claim 5, wherein the controller is further configured to:

calculate, for each of the first plurality of storage areas, a counter ratio that is a value obtained by dividing a value of a corresponding counter by the first threshold value;

specify, among the first plurality of storage areas, a storage area in which the counter ratio is larger than a third threshold value as one of the second plurality of storage areas; and specify, among the first plurality of storage areas, a storage area in which the counter ratio is smaller than the third threshold value as one storage area that is not one of the second plurality of storage areas.

11. A method of controlling a magnetic disk device including a magnetic disk including a first plurality of storage areas arranged in a radial direction, and a magnetic head configured to write or read data to or from the magnetic disk, the method comprising:

setting an increment amount for each of a plurality of counters that is a group of counters respectively corresponding to the first plurality of storage areas;

incrementing a value of a first counter by an increment amount related to the first counter according to a write operation of writing data to the magnetic disk, the first counter being a counter of the plurality of counters corresponding to a first storage area, the first storage area being a storage area in a vicinity of a first position that is a position where data is written by the write operation;

executing an operation of calculating a remaining number of write times, which is a number of write operations for a vicinity of one storage area that are executable until a value of a counter corresponding to the one storage area reaches a first threshold value, based on an increment amount for the one storage area, for each of a second plurality of storage areas that is some or all of the first plurality of storage areas;

executing a rewrite operation on each of the second plurality of storage areas in an order according to the remaining number of write times in an idle state, the rewrite operation being an operation of reading all data from one storage area and writing all the read data to the one storage area; and resetting, among the second plurality of storage areas, a value of a counter corresponding to a storage area on which the rewrite operation has been executed.

12. The method according to claim 11, further comprising:

specifying, among the first plurality of storage areas, a storage area in which a value of a corresponding counter has reached the first threshold value;

executing the rewrite operation on the specified storage area; and resetting a value of a counter corresponding to the specified storage area.

13. The method according to claim 11, further comprising:

in the idle state, executing the rewrite operation on a second storage area; and executing the rewrite operation on a third storage area after the rewrite operation on the second storage area, wherein the remaining number of write times for the second storage area is smaller than the remaining number of write times for the third storage area.

14. The method according to claim 11, further comprising:

in the idle state, comparing the remaining number of write times with a second threshold value for each of the second plurality of storage areas; and executing, among the second plurality of storage areas, the rewrite operation on a storage area in which the remaining number of write times is larger than the second threshold value after the rewrite operation on a storage area in which the remaining number of write times is smaller than the second threshold value.

15. The method according to claim 11, further comprising setting the increment amount for the counter corresponding to the first storage area according to a vibration of the magnetic head or a temperature during the write operation with respect to the first position.

16. The method according to claim 11, further comprising:

calculating, for each of the first plurality of storage areas, a counter ratio that is a value obtained by dividing a value of a corresponding counter by the first threshold value;

specifying, among the first plurality of storage areas, a storage area in which the counter ratio is larger than a third threshold value as one of the second plurality of storage areas; and specifying, among the first plurality of storage areas, a storage area in which the counter ratio is smaller than the third threshold value as one storage area that is not one of the second plurality of storage areas.

17. The method according to claim 12, further comprising:

calculating, for each of the first plurality of storage areas, a counter ratio that is a value obtained by dividing a value of a corresponding counter by the first threshold value;

specifying, among the first plurality of storage areas, a storage area in which the counter ratio is larger than a third threshold value as one of the second plurality of storage areas; and specifying, among the first plurality of storage areas, a storage area in which the counter ratio is smaller than the third threshold value as one storage area that is not one of the second plurality of storage areas.

18. The method according to claim 13, further comprising:

calculating, for each of the first plurality of storage areas, a counter ratio that is a value obtained by dividing a value of a corresponding counter by the first threshold value;

specifying, among the first plurality of storage areas, a storage area in which the counter ratio is larger than a third threshold value as one of the second plurality of storage areas; and specifying, among the first plurality of storage areas, a storage area in which the counter ratio is smaller than the third threshold value as one storage area that is not one of the second plurality of storage areas.

19. The method according to claim 14, further comprising:

calculating, for each of the first plurality of storage areas, a counter ratio that is a value obtained by dividing a value of a corresponding counter by the first threshold value;

specifying, among the first plurality of storage areas, a storage area in which the counter ratio is larger than a third threshold value as one of the second plurality of storage areas; and specifying, among the first plurality of storage areas, a storage area in which the counter ratio is smaller than the third threshold value as one storage area that is not one of the second plurality of storage areas.

20. The method according to claim 15, further comprising:

calculating, for each of the first plurality of storage areas, a counter ratio that is a value obtained by dividing a value of a corresponding counter by the first threshold value;

specifying, among the first plurality of storage areas, a storage area in which the counter ratio is larger than a third threshold value as one of the second plurality of storage areas; and specifying, among the first plurality of storage areas, a storage area in which the counter ratio is smaller than the third threshold value as one storage area that is not one of the second plurality of storage areas.

* * * * *